RADIO HORN

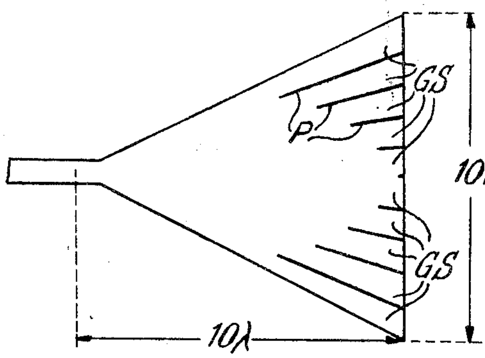
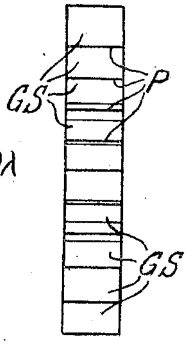
Fig. 1. Fig. 2.
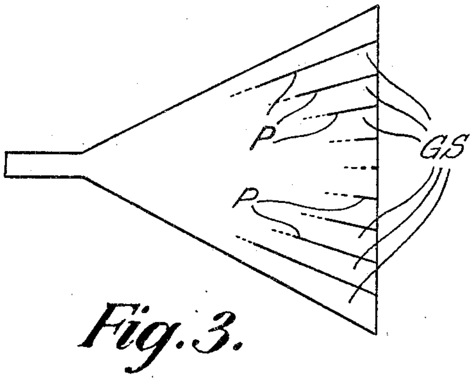
Fig. 3.
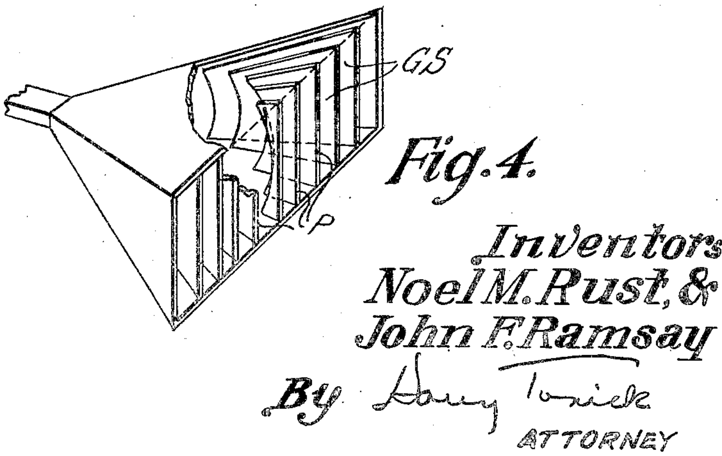
Fig. 4.
Inventors
Noel M. Rust, &
John F. Ramsay
By [signature]
ATTORNEY Sept. 1, 1953 N. M. RUST ET AL 2,650,985

Filed Sept. 9, 1947 6 Sheets-Sheet 2

Inventors
Noel M. Rust, &
John F. Ramsay
BY Harry Tenick
ATTORNEY

RADIO HORN

Inventors
Noel M. Rust, &
John F. Ramsay

By [signature]
ATTORNEY

Inventors
Noel M. Rust &
John F. Ramsay
By [signature]
ATTORNEY

RADIO HORN

Inventors
Noel M. Rust &
John F. Ramsay
By [signature]
ATTORNEY

Inventors
Noel M. Rust &
John F. Ramsay
By Harry Tonick
ATTORNEY

Patented Sept. 1, 1953 2,650,985

UNITED STATES PATENT OFFICE 2,650,985

RADIO HORN

Noël Meyer Rust and John Forrest Ramsay, Chelmsford, England, assignors, by mesne assignments, to Radio Corporation of America, New York, N. Y., a corporation of Delaware Application September 9, 1947, Serial No. 772,960
In Great Britain March 19, 1946

Section 1, Public Law 690, August 8, 1946
Patent expires March 19, 1966

11 Claims. (Cl. 250—33.63)

This invention relates to radio horns, that is to say horn-like devices for directing very high frequency radio energy. Radio horns have a considerable field of application e. g. to communication systems, navigation aiding systems (especially for aircraft use) and radar systems.

One of the difficulties encountered in the use of horns whether fed by wave guides or other means is that the lengths of the paths from the small end or "virtual apex" of the horn to different points in the plane of its aperture are different with the result that the field is not uniform in phase over the said plane and, in general, uniformity of phase of field over the aperture is necessary to efficient radiation. In the case of a horn of wide aperture in relation to the wave length, and of length comparable to the aperture, this defect becomes serious, being very detrimental to the directivity of the horn, and imposes serious constructional limitations since if a good standard of directivity is to be maintained the horn must be made of great length which results either in excessive bulk or expensive and complicated folding. The present invention seeks to reduce or avoid this defect and the limitations resulting therefrom.

The invention is based upon the fact that the phase of field in a space bounded on at least two sides by conductive walls placed parallel to the electric field and not less than half a wave length apart progresses at a velocity greater than the velocity in free space, this increase in velocity resulting from the interaction of waves reflected from the boundary walls. This field velocity or phase velocity may be controlled by controlling the spacing of the boundary walls, this spacing being, of course, always not less than a half wave length.

The present invention is based upon the above mentioned physical phenomenon and consists in its main feature in utilising the said phenomenon to compensate for the effect of different path lengths between apex and aperture of a horn so as to ensure that despite different path lengths there is a pre-determined phase distribution which is usually required to be uniformity of phase—over the said aperture. The simplest and most common case is that in which the aperture lies in a geometrical, i. e. a flat plane, but the invention is not limited to this case and may be employed in cases in which the aperture lies on a curved surface e. g. a cylindrical surface. Again the aperture need not actually be across the mouth of a horn proper; as will be seen later it may be across the mouth of an attachment to a horn, the attachment being then regardable as part of a horn structure consisting of the horn proper and the attachment.

According to the main feature of this invention a radio horn structure comprises means for differently modifying the velocity of propagation over different paths from apex to aperture so as to compensate or correct to a desired degree for the effects of the different lengths of said paths on phase distribution across said aperture. Reference may be made to the co-pending divisional application, Serial No. 214,450, filed January 2, 1951, which claims subject matter disclosed but not claimed in this application.

The invention is illustrated in and further explained in connection with the accompanying drawings.

There are various methods by which the invention may be carried into effect and these methods may be used either singly or in conjunction.

One method is to provide horn partition plates of pre-determined shape, extent and disposition which in effect divide up the horn into wave guide sections so dimensioned as to produce increase of velocity (as compared to the velocity in free space) so as to compensate for different path lengths in the horn and give uniformity of phase across the aperture.

Another method is to provide a horn with an attachment whose inner space is subdivided by suitably shaped and disposed plates into what are in effect wave guides which produce velocity changes such that uniformity of phase is obtained at the aperture of the attachment.

A third method consists in constricting the horn by giving it what may be termed delayed flaring up or advanced flaring down, that is to say, flaring up or down so as to produce required velocity changes to compensate for different path lengths.

The invention will be described with reference to the accompanying drawing forming a part of the specification in which:

Figs. 1 and 2 illustrate an embodiment of the invention wherein a wave guide horn is flared in one dimension only;

Figs. 3 and 4 illustrate a horn effectively flared in two dimensions according to the invention, Fig. 4*a* showing an alternate construction;

Figure 5A:
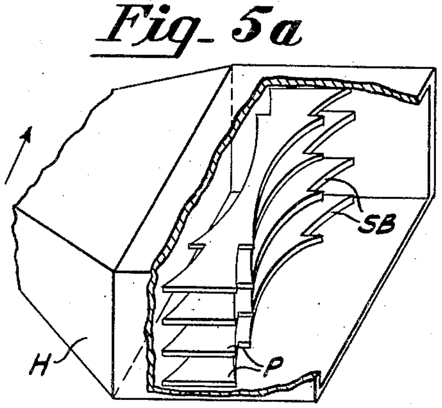
Fig. 5 illustrates another embodiment of the invention wherein the horn is effectively flared by means of plates arranged in an extension member, Fig. 5*a* showing an alternate construction.
Figure 10A:
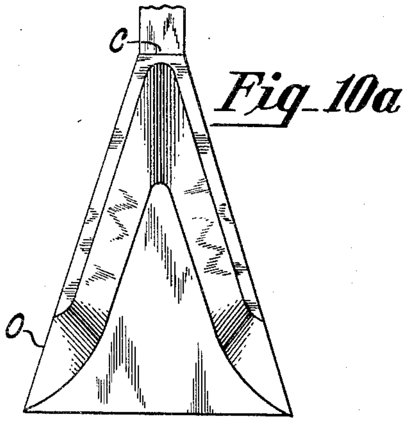
Figure 11A:
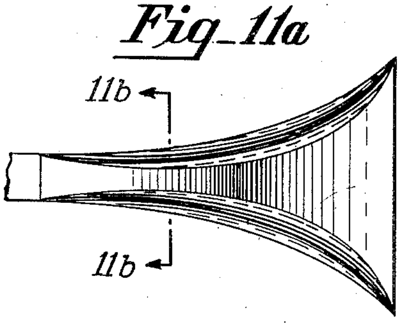
Figure 12A:
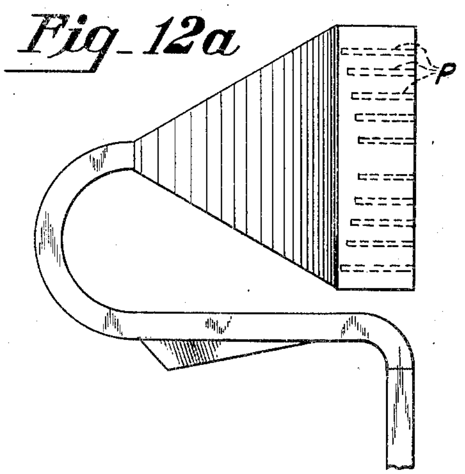
Figure 11B:
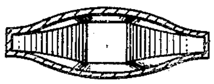
Figure 5:
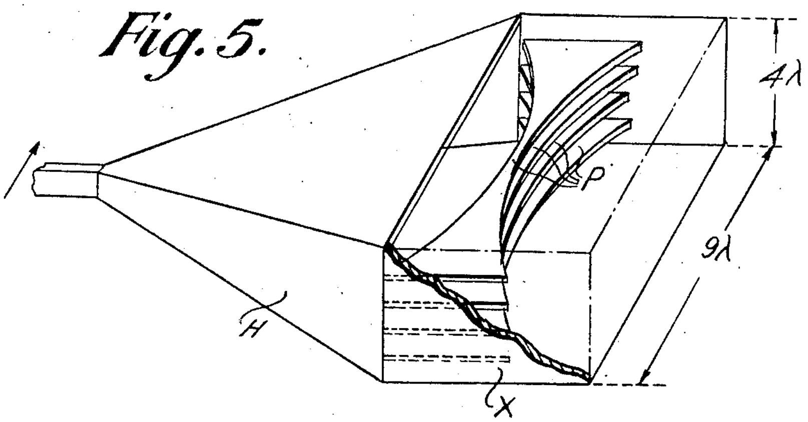
Figure 10:
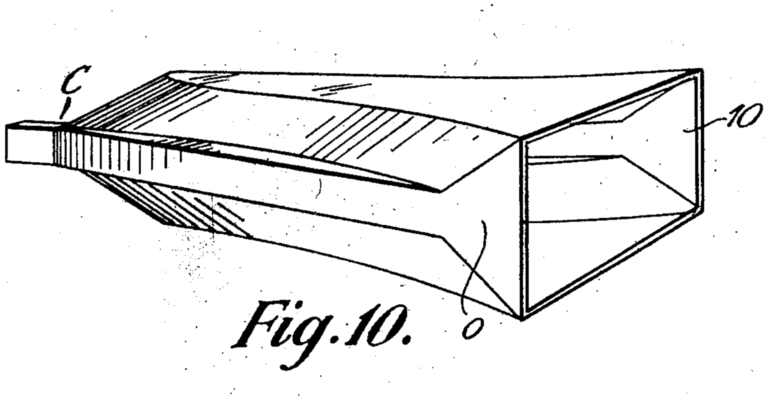
Figure 11:
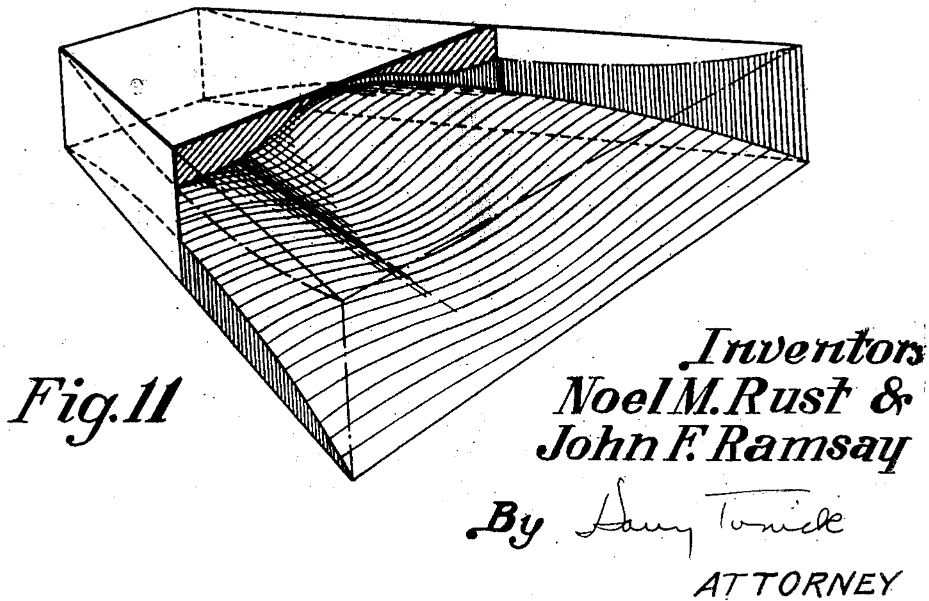
Figure 12:
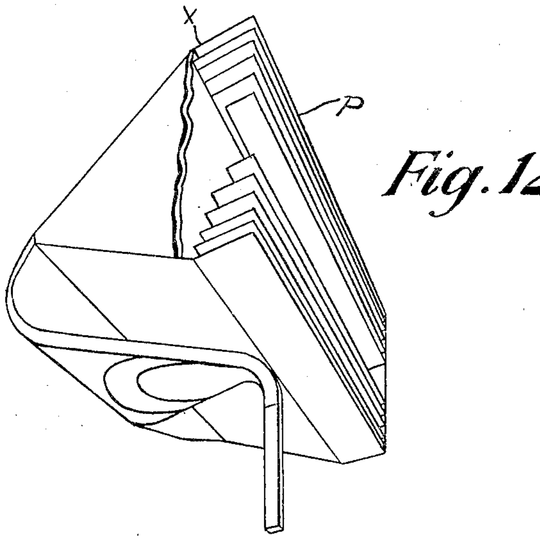

Figs. 6, 7, 8, and 9 illustrate various modes of arranging the plates shown in the embodiment of Fig. 5 to effect a pre-determined flaring;

Fig. 10 is a view of a horn having phase compensation provided by specially shaping the horn itself, and Fig. 10*a* is a top view of the embodiment of Fig. 10;

Fig. 11 is a view of another horn having phase compensation provided by shaping the horn itself; Fig. 11*a* is a view of the internal surface only of Fig. 11 as seen from the side, but with the flare in the E plane at the throat end exaggerated; Fig. 11*b* is a view of Fig. 11 from the mouth having, however, uniform, rather than variable wall thickness;

Fig. 12 is a view of a horn with bent axis shaped to give phase compensation, and Fig. 12*a* is a side view of the embodiment of Fig. 12.

Referring to Figures 1 and 2 which show in diagrammatic section and end view respectively one embodiment of the invention as applied to a horn flared out in one plane only for use with waves with polarisation perpendicular to the plane of flaring, the horn is divided into what are in effect a series of wave guide sections GS by means of plates P at right-angles to the parallel walls of the horn the plates being radial as viewed in a direction perpendicular to said parallel walls (re as viewed in Figure 1) so that the plates all point from the mouth of the horn towards the apex. The plates nearest the flared walls are longest and diminish in length towards the centre of the horn so that the velocity increase in the outermost wave guide sections is greater than that in the more inward sections whereby the greater lengths of the outer paths from apex to aperture are compensated. Typical practical dimensions in terms of the wave length (λ) are indicated in Figure 1.

Figure 4A:
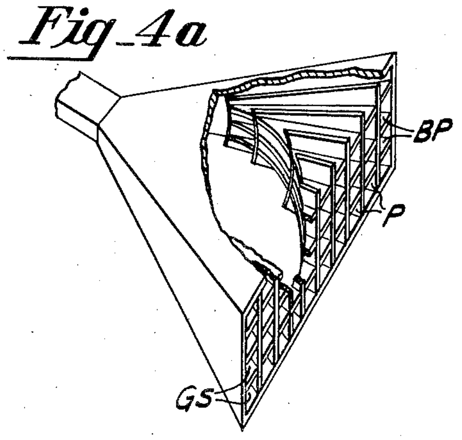

The principle embodied in the construction just described may be extended as shown in Figures 3 and 4 to a horn which is flared in both planes. Figure 3 is a diagrammatic axial section and Figure 4 a perspective view. As will be seen the sub-dividing plates are not only of varied length but their inner edges are curved (see Fig- 4) whereas in the case of Figures 1 and 2 for a horn flared in one plane only the ends of the sub-dividing plates may be simply straight.

In another class of embodiment, instead of providing path length correcting velocity increasing plates in the flared part of the horn, a straight rectangular horn extension may be provided and suitably shaped and disposed sub-dividing plates mounted across the extension so that although there will not be uniformity of phase where the energy enters the extension there will be the desired uniformity across what is now the effective aperture of the whole horn structure (comprising horn proper and extension) i. e. where the energy leaves the extension. Plates sub-dividing such an extension into wave guide sections may be simple rectangular plates of different sizes or they may be plates with inner curved edges also of different sizes or they may be plates with both edges curved. Figure 5 is an embodiment of this nature, the horn proper being indicated at H and the extension at X, the plates curved on both edges, being shown at P. The particular arrangement in any case will depend upon design requirements and the plates will be horizontally or vertically disposed in dependence upon the plane of polarisation. In Fig. 5*a* an alternate construction having stepped back plates SB is shown, the operation and advantages of which later will be described.

Figure 6:
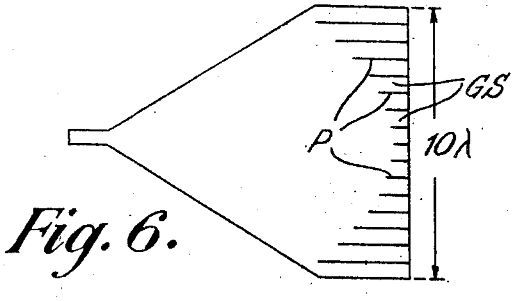
Figure 7:
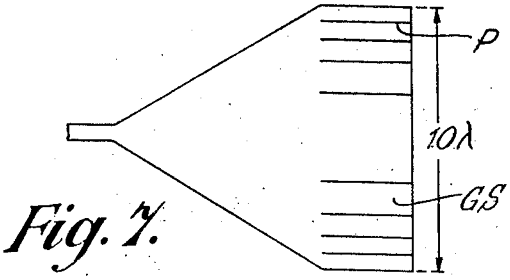
Figure 8:
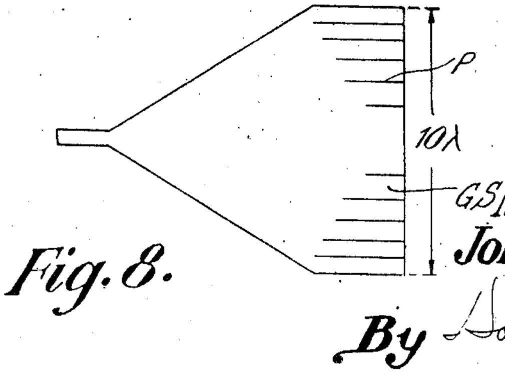

For all embodiments in accordance with this invention the partition plates may be of uniform spacing with their lengths varied or they may be of uniform length with their spacing varied or both spacing and length may be varied to provide the required compensation. These three possibilities are indicated in Figures 6 to 8, Figure 6 showing constant spacing and varied length, Figure 7 showing varied spacing and constant length and Figure 8 showing both length and spacing varied. Again the spacing of the plates may, if desired, be varied over the individual lengths of the wave guide sections formed thereby. Where both length and spacing are varied the design may be and preferably is such that each wave guide section is an integral number of half wave lengths long, i. e. an integral number of half wave lengths in the wave guide. This design expedient has the advantage of facilitating matching the impedance of the horn to the impedance of a feeding wave guide.

Figure 9:
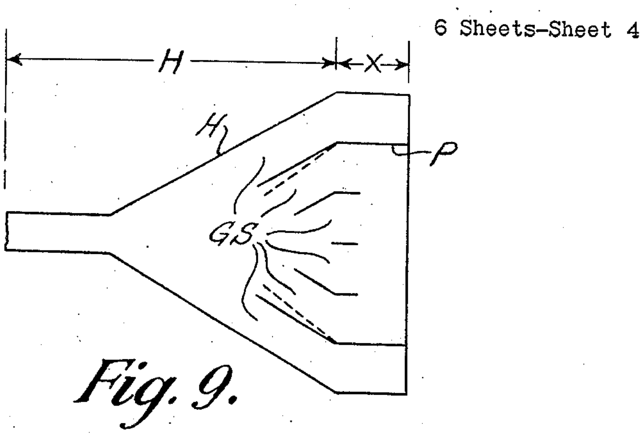

The methods of carrying out the invention which consist in providing partition walls in a horn or in an extension to the horn may be employed in combination. For example, a horn structure may comprise as shown in Figure 9 a horn proper H and a parallel sided box like extension X with partition plates P shaped and dimensioned to produce the required compensation for different path lengths arranged in the extension member and also extending into the horn proper. In the case shown the partition plates P are angularly bent where they pass from the horn proper H into the extension X, parts of the plates lying parallel to the extension axis and parts lying parallel to the flared sides of the horn proper as shown. The plates P may be bent over as indicated and by suitably adjusting the angles of bending of the individual plates a degree of control of the amplitudes of the energies entering the individual wave guide sections GS and a degree of control of the amplitude distribution across the horn thereby obtained. This is indicated in Fig. 9 by showing alternative angles of bending for two of the plates in broken lines.

This arrangement of partition plates parallel to the walls of a horn or extension, though probably the simplest to design is not essential for it will be apparent from a consideration of first principles that other arrangements can be utilised since the wave guide sections into which a horn proper and/or an extension is or are divided in carrying out this invention need not be of uniform cross section nor such as to provide a constant velocity of propagation along their lengths. The requirement of the invention is that the modification of velocity of propagation produced by the subdivision into what are in effect wave guide sections shall be such as to compensate, as regards phase distribution across a flat or curved surface constituting the aperture for different lengths of path between the feeder wave guide or line and the aperture and so far as fundamental considerations are concerned it is of secondary importance whether the velocity modification is effected uniformly or not.

In applying the invention to a horn in which it is required to flare out the horn in the plane of the electric field more than in that of the magnetic field the invention may be carried into effect without the use of partition plates by regarding the horn as a wave guide in which the dimensions between the boundaries parallel to the plane of polarisation, i. e. those boundaries which control the phase velocity of the field, are modified from what would normally be adopted in order to secure equal time delay for each ray path from apex to aperture. This may be done either by what may be termed delayed flaring or by what may be termed constriction. The former case is illustrated in Figure 10 in which the horn is so shaped that the outer paths continue restricted to the original feeding wave guide dimensions for a length dependent upon their distance from the horn axis before flaring to the aperture, while the inner paths flare out earlier. As shown the outer paths flare out at O and the central path at C so that the central or axial path is the shortest and starts to flare out immediately while the outer paths flare out last. A plan view of the embodiment of Fig. 10 is shown in Fig. 10*a*. In this way there may be achieved a design in which a substantial equiphase surface is produced at the aperture. In the second or constricted method illustrated schematically in Figure 11 the central path is left without constriction while the outer paths are constricted more or less in dependence upon their path lengths. Fig. 11*a* is a view of the internal surface only of Fig. 11 as seen from the side, but with the flare in the E plane at the throat end exaggerated. Curved wall surfaces are used as shown in Figure 11*a* to produce the required varying constriction effect across the horn, speeding up of the field occurring in the restricted paths in accordance with the amount of restriction. A cross sectional view of the embodiment of Fig. 11*a* looking into the apex of the horn is shown in Fig. 11*b*.

In Fig. 11*b*, a uniform wall thickness is shown, rather than the variable thickness of wall in Fig. 11.

Where it is desired to produce a horn of wide aperture in the E plane (electric plane) but norrow aperture in the H plane (magnetic plane) the opposite to delayed flaring may be used, i. e. the narrowing down from feeder wave guide dimension to the required narrow aperture dimension may be carried out earlier for the outer paths than for the inner and central paths, the design being again such as to produce a substantially equi-phase aperture. To this end, the spacing between the velocity modifying plates or sides of the horn is less at a greater distance from the horn axis and the line elements of these sides defined by the intersection therewith of a plane normal to the axis approach parallelism with the plane of the electric vector at the ends of these line elements remote from the axis, as in Fig. 10 or 11. Such line elements are clearly illustrated in Fig. 11. In order to avoid defects due to the ray paths being bent by refraction it is desirable, and in some cases may be found essential, to provide suitably disposed metal plates normal to the direction of the electric field at the entrance to the phase correcting part of the horn and extending along this part in such a way as to guide the wave elements. These plates should not be confused with those which divide a horn with wave guide sections, for the latter are parallel to the electric field and therefore at right angles to the former. Again such metal plates which extend normal to the electric field and to the extension of the velocity modifying plates and which may be termed baffles may be provided in other constructions in accordance with this invention, e. g. in a horn extension, the baffles, in conjunction with the velocity modifying plates then resulting in a honeycomb like or cellular structure as shown at BP in Fig. 4*a*. It is understood, of course, that any of the other embodiments shown may likewise be provided with baffle plates.

The expedients of velocity modification by delayed flaring up or flaring down; by constriction; and by partition plates sub-dividing the horn plates into wave guide sections may be adopted in any desired combination each of the expedients adopted contributing its quota to the total velocity modification introduced. Further the methods of the invention are not limited to their application to straight horns for obviously they may be employed also for folded horns as shown in Fig. 12, Fig. 12*a* being a side view thereof. Figure 12 shows a folded horn with an extension X housing plates P. They are also very advantageous when applied to the construction of what may be termed "skew horns" or "part horns." This is a very important class of embodiment practically. In one embodiment of this class illustrated in the mutually perpendicular views of Figures 13 and 14 a "skew horn" or "part horn" H' is, in effect, a normally shaped horn which is cut away along a plane parallel to the axis—for example along a plane passing through the axis—and mounted on a flat surface (e. g. the ground G) with the plane of cutting on that surface. Thus where the cutting plane passes through the axis the result would be a half-horn resting on the flat surface.

Figure 13:
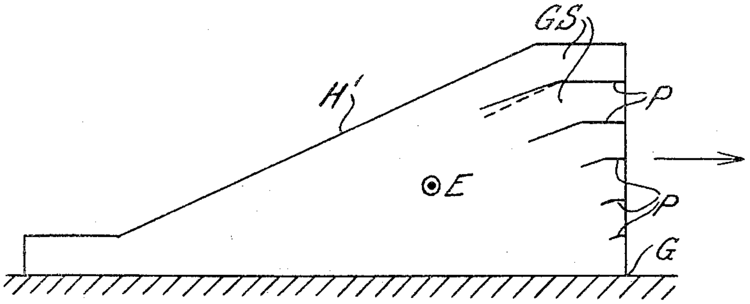
Figure 14:
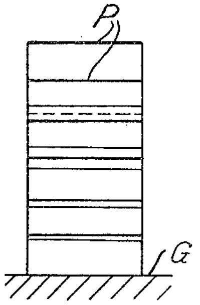
Figure 15:
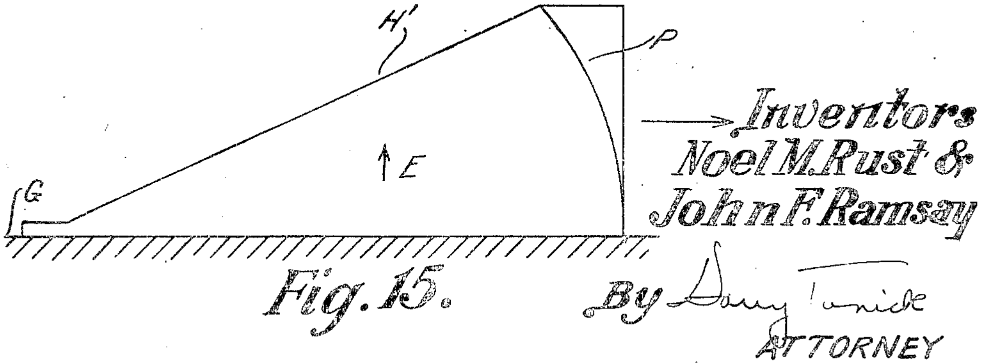
Figure 16:
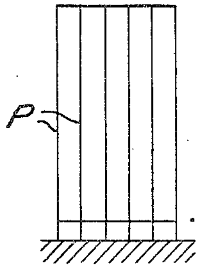

By means of partition plates P and/or flaring provided in accordance with this invention the phase distribution across the mouth of the half horn may be made such as to give a directional beam parallel to the axis although the horn is not geometrically symmetrical with respect to the axis. The plates P may be bent over and, as in Fig. 9 a degree of control of the amplitude distribution across the horn obtained by suitably adjusting the angles of bending (indicated in broken line for one plate). Figures 15 and 16 show another construction of this type for the case where the electric field is at right-angles to that for Figures 13 and 14. In Figures 13 and 15 the direction of the electric field is indicated conventionally at E. The great practical advantage of this type of construction is that the energy feeding apparatus at the "small end" of the horn may be brought at or near ground or building level—an advantage leading to great constructional convenience and economy.

Figure 17:
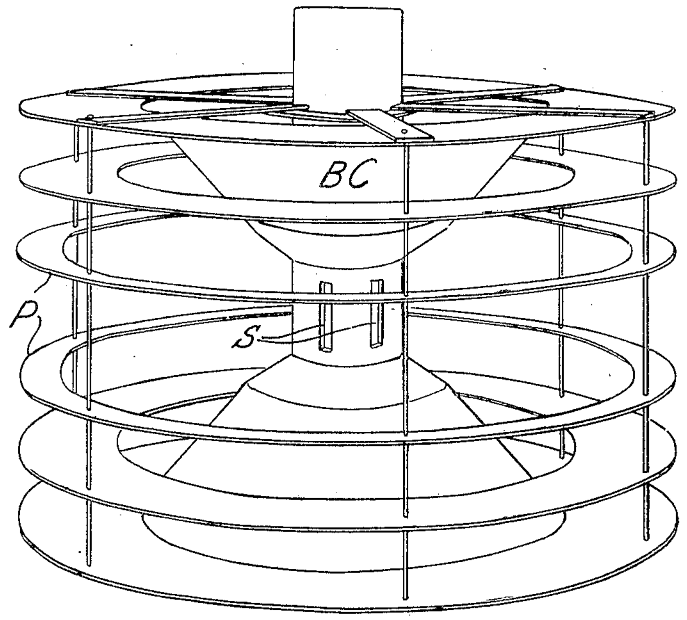

The principles of the invention may be extended to so-called bi-cones which produce circular polar diagrams, in all horizontal planes and a relatively sharp beam in all vertical planes. For example in the case of a bi-cone exciting vertically polarised waves phase correction may be effected by vertical partition plates of suitable varying profile arranged radially round the periphery of the bi-cone structure. In the case of a bi-cone excited by bent dipoles or by loops to produce an all-round horizontally polarised field, phase correction may be effected in accordance with this feature of the invention by providing a plurality of parallel peripheral ring plates round the bi-cone structure and of different radial lengths, those nearest the centre being shorter than the outer ones. In the case of bi-cones with very large cylindrical apertures it is very convenient to omit the outer parts of the bi-cone. In such a case a suitable construction of partition plates may be provided at a little distance from the actual bi-cone orifice. One form of bi-cone structure in accordance with the invention is illustrated, in Figure 17 in which the bi-cone BC with energy radiating slots at S is provided with ring plates P.

In all cases in accordance with this invention in which the path differences to be corrected for exceed a wave length, that is to say in which the lengths of the paths for which correction is to be applied exceed the shortest path by one or more wave-lengths, it is necessary only to correct for such path differences in excess of a wave length or an integral number of wave lengths will clearly not introduce any phase change. In other words partition plates or other devices provided in carrying out this invention may be of stepped construction being stepped back at each point or points corresponding to a path difference of an integral number of wave-lengths as shown in Fig. 5*a*. Further although the partition plates and other conducting surfaces have been specifically described as plates or surfaces of solid material it will be obvious to those skilled in the art that they may be perforated for lightness or to reduce windage or made of wires or gauze (as may be desired) for the same reasons and the term "plates" is intended to cover all such constructions.

Although the invention has been described with reference to the transmission of radio energy it will be apparent to those skilled in the art that the constructions described herein may also be used for reception if desired since a radio horn is in essence a reversible device.

Having now particularly described and ascertained the nature of our said invention and in what manner the same is to be performed, we declare that what we claim is:

1. A radio antenna system comprising wave guide transmission means including a continuous conductive surface arranged to form a horn antenna with an axis and adapted to guide radio waves between the horn antenna mouth and the horn antenna throat along said axis with said waves polarized with their electric vectors normal to said axis and parallel to a predetermined straight line intersecting and normal to said axis, said horn antenna having means at one throat end for coupling to a radio frequency transducer and being open to free space at the other mouth end thereof; said conductive surface having side surfaces bounding said horn antenna in the dimension parallel to said predetermined line, said side surfaces diverging from said throat end to said mouth end; said conductive surface having opposed surface portions one each on a different side of said axis bounding said horn antenna in the dimension normal to said axis and to said predetermined line, said opposed surface portions first converging and then diverging from said throat end to mouth end; said opposed surface portions being spaced apart in the dimension normal to said axis and to said vectors by a spacing decreasing with increasing distance in the directions parallel to said predetermined line and away from said axis, the line elements of said surface portions defined by their surface intersections with a plane normal to said axis approaching parallelism with said predetermined line at the extremities of said line elements remote from said axis in the directions of said predetermined line, to differentially modify the velocity of propagation of the wave energy translated through the guide means to compensate for the effects of different path lengths within said passage on the phase distribution of the energy.

2. A radio antenna system comprising wave guide transmission means including a continuous conductive surface arranged to form a horn antenna having an axis and having an apex adapted to be coupled to a radio frequency transducer for radio waves at one throat end of said horn antenna and an aperture open to free space at the other mouth end thereof, said conductive surface comprising two pairs of plane surface elements parallel to said axis and each element parallel to the other, one element of each pair facing the other element of the same pair and coextensive therewith in the directions parallel to said elements, one pair being spaced apart farther than the other in the direction normal to said elements, said other pair having its edges nearer said axis a greater distance from said axis in the directions normal to said axis and parallel to said elements than the outer edges remote from said axis of said one pair and said other pair outer edges still farther from said axis in said last described directions, two further non-parallel plane surface elements joining said outer edges of said other pair of parallel surface elements, each further element defining a side of said horn antenna, the two sides thus defined diverging from said throat end to said mouth end, and two continuous skew surface elements each of which respectively joins the inner edges of a different one of said other pair of parallel elements to the outer edges of a different one of said one pair of parallel elements, thereby to complete said horn antenna, said skew surface elements being arranged to differentially modify the velocity of propagation of the wave energy translated through the horn antenna to compensate for the effect of different path lengths within said horn antenna on the phase distribution of the energy at said apex and said aperture.

3. A radio antenna system comprising a horn antenna structure with a central axis and including a conductive surface arranged to define the wave guide passage of the horn antenna with the radio waves polarized with their electric vectors normal to said axis and parallel to a predetermined straight line intersecting and normal to said axis, said passage having an apex adapted to be coupled to wave transmission means at one throat end of said passage and an aperture open to free space at the other mouth end thereof, said conductive surface having opposed surface portions one each on a different side of said axis, said surface portions being spaced apart in the dimension normal to said axis and normal to said vectors by a spacing decreasing with increasing distance in the directions parallel to said predetermined line and away from said axis, the intersections of said surface portions with a plane normal to said axis defining line elements which line elements approach parallelism with said predetermined line at the extremities of said line elements remote from said axis in the directions of said predetermined line, thereby to differentially modify the velocity of propagation along the several paths between said apex and said aperture.

4. A radio antenna system comprising wave guide transmission means including a continuous conductive surface arranged to form a horn antenna with a central axis and adapted to guide radio waves between the horn antenna mouth and the horn antenna throat along said axis with said waves polarized with their electric vectors normal to said axis and parallel to a predetermined straight line intersecting and normal to said axis, said horn antenna having an apex adapted to be coupled to radio frequency transducer means for said waves at one throat end of said horn antenna and an aperture open to free space at the other mouth end thereof, said conductive surface comprising two diverging surface elements defining sides of said horn antenna and bounding said horn antenna in the directions normal to said axis and parallel to said predetermined line, further surface portions at least one of which includes at least one warped surface element, said further surface portions joining said diverging surface elements to complete said horn, said further surface portions being spaced apart in the dimension normal to said axis and to said vectors by a spacing decreasing with increasing distance in the directions parallel to said predetermined line and normal to said axis, the intersections of said further surface portions with a plane normal to said axis defining line elements which line elements approach parallelism with said predetermined line at the extremities of said line elements remote from said axis thereby to differentially modify the phase velocity of the wave energy guided by said horn.

5. A radio antenna system comprising wave guide transmission means including a continuous conductive surface arranged to form a horn antenna with a central axis and adapted to guide radio waves between the horn antenna mouth and the horn radiator throat along said axis with said waves polarized with their electric vectors normal to said axis and parallel to a predetermined straight line intersecting and normal to said axis, said horn antenna having an apex adapted to be coupled to radio frequency transducer means for said waves at one throat end of said horn antenna and an aperture open to free space at the other mouth end thereof, said conductive surface comprising two non-parallel plane surface elements defining sides of said horn antenna and bounding said horn antenna in the directions normal to said axis and parallel to said predetermined line, two further surface elements each including at least one warped surface element joining said non-parallel plane surface elements to complete said horn, said warped surface elements being spaced apart in the dimensions normal to both said predetermined line and to said axis a distance decreasing with distance in the directions away from said axis and parallel to said predetermined line, and said further elements approaching parallelism with said line at their joinings with said non-parallel plane surface elements, thereby to differentially modify the velocity of propagation of the wave energy translated.

6. A radio antenna system comprising wave guide transmission means including a continuous conductive surface arranged to form a horn antenna with a central axis and adapted to guide radio waves between the horn antenna mouth and the horn antenna throat along said axis with said waves polarized with their electric vectors normal to said axis and parallel to a predetermined straight line intersecting and normal to said axis, said horn antenna having an apex adapted to be coupled to radio frequency transducer means at one throat end of said horn antenna and an aperture open to free space at the other mouth end thereof, said conductive surface comprising two non-parallel plane surface elements defining sides of said horn antenna and bounding said horn antenna in the directions normal to said axis and parallel to said predetermined line, and two further surface elements each including both a pair of additional plane surface elements parallel to said predetermined line and a warped surface element, said two further surface elements joining said non-parallel plane surface elements to complete said horn, the additional pair of plane surface elements of one further surface element lying substantially parallel to those of the other and each pair interconnected by the warped surface element respectively of the further surface element of which it is a part, said warped surface elements being spaced apart in the dimension normal to both said electric vectors and to said axis a distance decreasing with distance in the directions away from said axis and parallel to said predetermined line, thereby to differentially modify the velocity of propagation of the wave energy translated.

7. A radio antenna system comprising wave guide transmission means including a continuous conductive surface arranged to form a horn antenna with a central axis and adapted to guide radio waves between the horn antenna mouth and the horn antenna throat along said axis with said waves polarized with their electric vectors normal to said axis and parallel to a predetermined straight line normal to and intersecting said axis, said horn antenna having an apex adapted to be coupled to radio frequency transducer means at one throat end of said horn radiator and an aperture open to free space at the other mouth end thereof, said conductive surface comprising two non-parallel plane surface elements defining sides of said horn antenna bounding said horn antenna in the directions normal to said axis and parallel to said predetermined line, and a substantially flat surface element joining corresponding edges of said non-parallel plane surface elements to form a third side of said horn, and a warped surface element joining the other corresponding edges of said non-parallel elements to complete the sides of said horn, said warped surface element being spaced apart from said flat surface element in the dimensions normal to said predetermined line and to said axis a distance decreasing with distance in the directions away from said axis and parallel to said predetermined line, the line elements of said flat surface and of said warped surface element defined by their surface intersections with a plane normal to said axis approaching parallelism with said predetermined line at the extremities of said line elements remote from said axis, thereby to differentially modify the velocity of propagation of the wave energy translated.

8. The antenna system claimed in claim 3, said axis being folded.

9. The antenna claimed in claim 4, each of said diverging surface elements being planar.

10. The radio antenna system claimed in claim 3, the said plane intersecting said conductive surface defining said passage to define a closed curve bounding an area in the shape of two winged portions at the sides and a central enlarged body portion.

11. A radio antenna system comprising waveguide transmission means including a continuously flared conductive surface arranged to form a horn antenna with an axis and adapted to guide radio waves between the horn antenna mouth and the horn antenna throat along said axis with said waves polarized with their electric vectors normal to said axis and parallel to a predetermined straight line normal to and intersecting said axis, said horn antenna having an apex adapted to be coupled to a radio frequency translating means at one throat end of said horn antenna and an aperture open to free space at the other mouth end thereof, the interior of said conductive surface having a plurality of different path lengths from said apex to said aperture whereby the phase distribution of energy appearing at said aperture is not uniform with respect to that at said apex, said conductive surface including two non-parallel substantially plane surface elements defining opposite sides bounding said horn in the dimensions parallel to said predetermined line and further surface elements joining said non-parallel plane surface elements to complete said horn, at least one of said further surface elements having warped surface portions, said further elements being spaced apart and bounding said horn in the dimensions normal to both said predetermined line and to said axis a spacing decreasing with distance in the direction away from said axis and parallel to said predetermined line, the line elements of said further surface elements defined by their intersections with a plane normal to said axis approaching parallelism with said predetermined line at the extremities of said line elements remote from said axis in the directions of said predetermined line, to differentially modify the velocity of propagation of wave energy translated along said different path lengths between said apex and said aperture to compensate for said non-uniform phase distribution.

NOËL MEYER RUST.
JOHN FORREST RAMSAY.

References Cited in the file of this patent

UNITED STATES PATENTS

| Number | Name | Date |
|---|---|---|
| 1,992,268 | Wente | Feb. 26, 1935 |
| 2,129,669 | Bowen | Sept. 13, 1938 |
| 2,206,683 | Wolff | July 2, 1940 |
| 2,283,935 | King | May 26, 1942 |
| 2,317,464 | Katzin | Apr. 27, 1943 |
| 2,369,808 | Southworth | Feb. 20, 1945 |
| 2,401,601 | Atwood | June 4, 1946 |
| 2,405,242 | Southworth | July 6, 1946 |
| 2,415,807 | Barrow et al. | Feb. 18, 1947 |
| 2,425,488 | Peterson et al. | Aug. 12, 1947 |
| 2,437,281 | Tawney | Mar. 9, 1948 |
| 2,442,951 | Iams | June 8, 1948 |
| 2,447,768 | Mueller | Aug. 24, 1948 |
| 2,461,005 | Southworth | Feb. 8, 1949 |

FOREIGN PATENTS

| Number | Country | Date |
|---|---|---|
| 891,949 | France | Mar. 23, 1944 |